(12) United States Patent
Turner et al.

(10) Patent No.: US 7,331,383 B2
(45) Date of Patent: Feb. 19, 2008

(54) SHORE POWER SYSTEM INCLUDING A HVAC SYSTEM

(75) Inventors: David Turner, Bloomfield Hills, MI (US); James Lester Oliver, Orion, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/601,867

(22) Filed: Nov. 20, 2006

(65) Prior Publication Data

US 2007/0062684 A1 Mar. 22, 2007

Related U.S. Application Data

(62) Division of application No. 10/848,783, filed on May 19, 2004.

(51) Int. Cl.
*B60H 1/00* (2006.01)
*F04D 15/00* (2006.01)

(52) U.S. Cl. .................. 165/202; 165/43; 62/244; 237/12.3 R; 318/3

(58) Field of Classification Search .............. 165/41, 165/42, 43, 44, 202, 203, 204, 240; 62/172, 62/238.1, 238.3, 238.4, 238.6, 238.7, 239, 62/244; 237/12.3 R, 12.3 A, 12.3 B; 318/3
See application file for complete search history.

(56) References Cited

U.S. PATENT DOCUMENTS

| | | | | |
|---|---|---|---|---|
| 3,559,724 A * | 2/1971 | Wilkinson | ................... | 165/259 |
| 3,841,108 A * | 10/1974 | Pierrat | .......................... | 62/244 |
| 4,172,493 A * | 10/1979 | Jacobs | ......................... | 165/42 |
| 4,380,909 A * | 4/1983 | Sung | ........................ | 62/238.3 |
| 4,617,472 A * | 10/1986 | Slavik | ........................ | 307/9.1 |
| 5,579,728 A * | 12/1996 | Gotmalm | ................ | 123/41.01 |
| 5,871,041 A * | 2/1999 | Rafalovich et al. | ......... | 165/202 |
| 5,918,472 A * | 7/1999 | Jonqueres | .................... | 62/172 |
| 5,993,312 A * | 11/1999 | Panoushek et al. | .... | 237/12.3 R |
| 6,182,435 B1* | 2/2001 | Niggemann et al. | .......... | 60/772 |
| 6,272,873 B1* | 8/2001 | Bass | ........................ | 62/238.3 |
| 6,543,240 B2* | 4/2003 | Grafton | ....................... | 62/244 |
| 7,043,931 B2* | 5/2006 | Plummer | ..................... | 62/244 |
| 7,096,925 B2* | 8/2006 | Bracciano | .................... | 165/42 |
| 2004/0231831 A1* | 11/2004 | Houck et al. | ............... | 165/202 |
| 2004/0256082 A1* | 12/2004 | Bracciano | ................... | 165/42 |
| 2005/0016713 A1* | 1/2005 | Houck et al. | .................. | 165/42 |
| 2005/0210903 A1* | 9/2005 | Allen | ......................... | 62/244 |
| 2007/0000266 A1* | 1/2007 | McEnaney et al. | ........ | 62/228.4 |
| 2007/0131408 A1* | 6/2007 | Zeigler et al. | .............. | 165/240 |

* cited by examiner

*Primary Examiner*—Ljiljana Ciric
(74) *Attorney, Agent, or Firm*—Martin J. Moran

(57) ABSTRACT

A shore power HVAC system for a vehicle is provided. The vehicle has a vehicular HVAC system with an engine compressor, a condenser, and an expansion valve and an evaporator coupled to each other in series by a plurality of conduits. The shore power HVAC system includes an electric compressor structured to compress a coolant fluid and a diverter valve structured to allow fluid to pass through a selected fluid path. The electric compressor is coupled to, and in fluid communication with the evaporator and the diverter valve. The diverter valve is further coupled to the engine compressor. Thus, a first coolant fluid loop and a second coolant fluid loop are created. The first coolant fluid loop passes through, in series, the engine compressor, the diverter valve, the condenser, the expansion valve, and the evaporator. The second coolant fluid loop passes through, in series, the electric compressor, the diverter valve, the condenser, the expansion valve and the evaporator. The diverter valve selectively directs which loop the coolant fluid may pass through.

4 Claims, 2 Drawing Sheets

SHORE POWER SYSTEM INCLUDING A HVAC SYSTEM

This is a divisional of Ser. No. 10/848,783 filed May 19, 2004.

BACKGROUND OF THE INVENTION

1. Field of the Invention

The present invention relates to an auxiliary power system for a vehicle and, more specifically, to an auxiliary power system that includes an HVAC system.

2. Background Information

Owning to a nautical origin, a land based auxiliary power system for providing electricity to a ship while the ship is docked is identified as a "shore power system." Shore power systems are also used to provide electrical power to land based vehicles such as trucks and recreational vehicles. Such shore power systems include both a stationary base assembly, located, for example, at a truck stop, and a vehicle assembly. The base shore power assembly and vehicle shore power assembly are coupled together to provide the vehicle with electrical power.

During normal road operation, a vehicle utilizes both electrical and mechanical energy provided by the vehicle's engine. Electrical power, created by a generator that is powered mechanically by the engine, is used to operate components such as the radio, lights, electric motors, such as the windshield wiper motors and fan motors, as well as any electrical control systems. The electrical system on a vehicle in the United States typically operates at 12V direct current. In other countries, vehicles may use a 24V direct current system. In addition to operating the generator, and providing propulsion, mechanical power is also used to cool the engine and operate the compressor for the vehicle HVAC (heating, ventilation, air conditioning) system. Also, thermal energy from the engine is used to provide heat to the HVAC system.

When the vehicle is at rest, many of the electrical systems, including recreational systems, are still used. That is, while the engine is not operating, the driver may still listen to the radio. If the electrical system is only used for a short time, electricity may be drawn from the vehicle battery. However, for extended use, such as an overnight stopover at a truck-stop, the battery cannot provide sufficient power. Thus, the vehicle must be connected to a shore power system that provides electricity for components such as radios, televisions, computers, telephones and other such devices. Generally, electricity is provided at 12V DC or 24 V DC, whichever corresponds to the native current for the vehicle electrical system. However, many electrical components used in long haul trucks and recreational vehicles, such as computers and televisions, are structured to operate with an alternating current. Thus, the current must be converted to an AC current. This conversion process is very inefficient, especially if, as is typical, the electricity supplied to the shore power system is an AC current that the shore power system converts to a DC current.

During road operation, the vehicular HVAC cooling system passes a coolant fluid through the fluid loop as shown in FIG. 1. The coolant fluid is delivered to the engine compressor 62 as a low pressure gas under suction. The engine compressor 62, which is powered mechanically by the engine 3, raises the pressure, and therefore temperature, of the coolant fluid. As the coolant fluid leaves the engine compressor 62, it is a high pressure gas under positive pressure. The high pressure gas coolant fluid is passed through a condenser 66 where it is cooled. A fan, which is powered mechanically by the engine 3, enhances the air flow over the condenser 66. Because the pressure remains constant, the coolant fluid is condensed into a liquid as the temperature is lowered. The high pressure liquid coolant fluid is passed through the expansion valve 68 before entering the evaporator 70. The evaporator 70 and an evaporator fan 71 are disposed in an enclosure 34 in, or adjacent to, the vehicle cabin. As the liquid coolant fluid expands to a gas in the evaporator 70, the evaporator 70 is chilled. The evaporator fan 71 disposed adjacent to the evaporator 70 draws air over the chilled evaporator 70 and blows the cooled air into the cabin. Often, the chilled air is too cold and heat from the road HVAC heating system is added to the cabin enclosure 34 to raise the temperature of the chilled air. After the evaporator 70, the coolant fluid is again a low pressure gas under suction which is returned to the engine compressor 62.

The vehicle's HVAC compressor, which requires a considerable amount of energy to drive, is, as noted above, mechanically driven and not the vehicle's electrical system. Thus, to heat or cool the vehicle cabin, truckers typically allow the vehicle engine to idle in order for the engine to provide heat or the normal mechanical power to the compressor. This solution to providing heat or power to the condenser is very inefficient, results in high engine maintenance and creates exhaust emissions.

There is, therefore, a need for an inexpensive solution for providing temperature controlled air for a vehicle at a shore power station.

There is a further need to provide temperature controlled air for a vehicle at a shore power station that does not require extensive vehicle modification.

There is a further need to provide alternating current for a vehicle at a shore power system.

SUMMARY OF THE INVENTION

These needs, and others, are met by the present invention which provides a shore power system structured to provide an AC current, a diverter valve coupled to the vehicular HVAC system, an electric heater, and an electric compressor. As used herein, the "vehicular HVAC" system is the HVAC normally employed by the vehicle as it travels. The vehicular HVAC cooling system includes the following components disposed in a first loop, and in the following series, along a fluid line; an evaporator, an engine compressor, a condenser, and an expansion valve. The engine compressor is powered mechanically by the engine. The road HVAC heating system includes a heat exchanger structured to receive hot engine coolant and a fan structured to move air over the heat exchanger and into the cabin.

The present invention provides for a shore power wherein the base shore power assembly is a simple electrical connection, preferably a standard 110V AC coupling. The vehicle shore power system includes an AC network having at least one outlet, an electric heater, an electric compressor, a DC converter, a DC line, and a control device. The AC network outlet may be used to provide electrical energy to off-the-shelf electrical items such as televisions, computers, and radios. The electric heater, which is powered by the AC network, provides heat. The DC converter and DC line are coupled to the vehicle electrical system to provide electrical energy to components such as the cabin lights as well as certain HVAC components such as the electric evaporator fan. Alternatively, the shore power system may include an AC evaporator fan. The diverter valve and electrical compressor provide cool air as described below.

The diverter valve allows for the creation of a second coolant fluid loop. The diverter valve has two fluid inlets and a single fluid outlet. The diverter valve selectively directs which fluid inlet is used. The diverter valve is placed on the first fluid loop just before the condenser. The engine compressor is coupled to the first diverter valve inlet. The electric compressor is coupled to the second diverter valve inlet. The evaporator is coupled to both the engine compressor and the electric compressor. The first coolant fluid loop passes through, in series, the engine compressor, the diverter valve, the condenser, the expansion valve and the evaporator. The second coolant fluid loop passes through, in series, the electric compressor, the diverter valve, the condenser, the expansion valve and the evaporator.

The electric compressor is structured to operate off of the 110V alternating current provided by the shore power system. The electrical condenser fan is placed adjacent to the condenser to aid in heat transfer and the condensing of the high pressure gas coolant fluid. The electric heater is used in the event that the air chilled by the evaporator is too cold. The electric heater may either heat the chilled air to raise the air temperature, may heat the coolant fluid just before the coolant fluid passes through the evaporator, or may simply provide warm air to the vehicle interior.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, when a fluid flow is described as passing through components "in series," the fluid passes through the components in the order listed. Additionally, it is understood that the components are typically linked and in fluid communication via one or more fluid conduits. The components may, however, be linked directly to each other.

Figure 1:
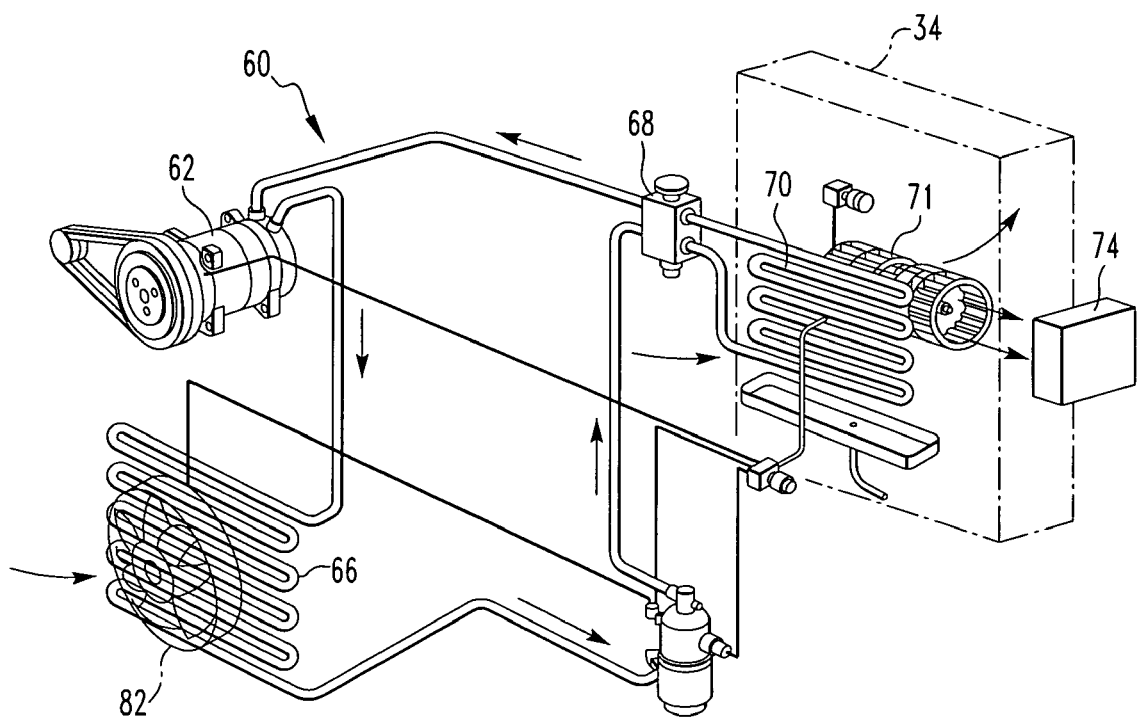
FIG. 1 is a schematic view of a prior art vehicle HVAC system.
Figure 2:
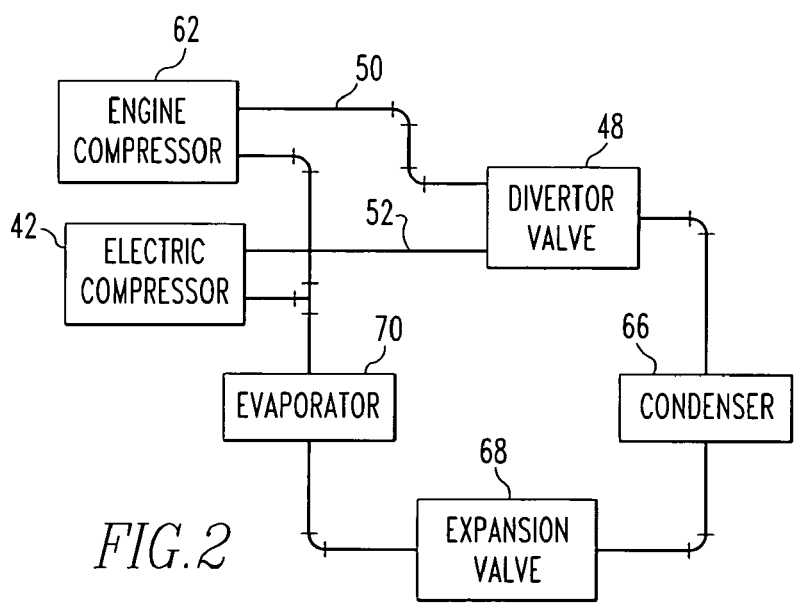
FIG. 2 is a diagram of the two coolant fluid loops of the present invention.
Figure 3:
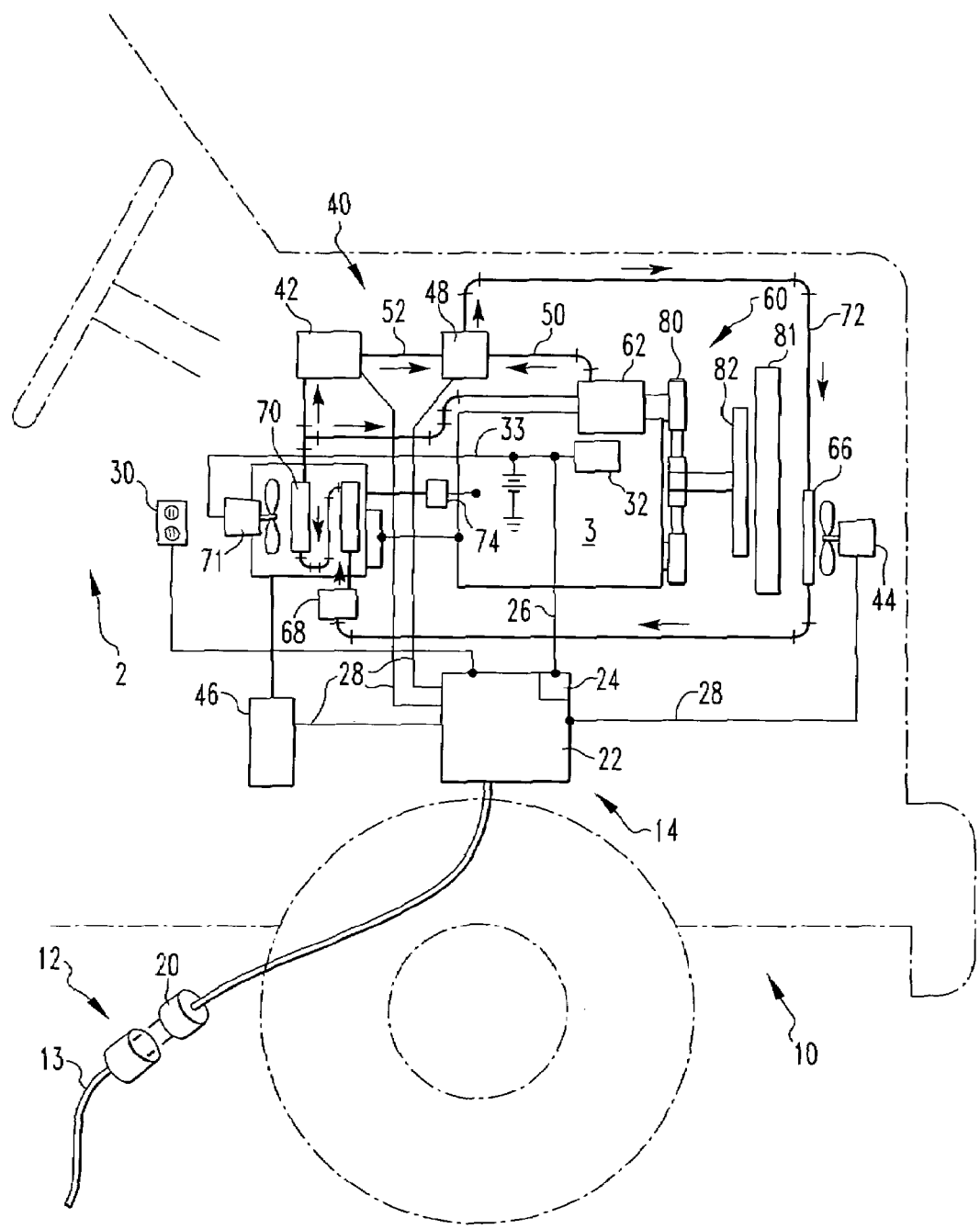
FIG. 3 is a schematic view of the two coolant fluid loops of the present invention.

As shown in FIGS. 2 and 3, the present invention provides a shore power system 10 for a vehicle 1. The shore power system 10 includes a shore power base assembly 12 and a shore power vehicle assembly 14. The base assembly 12 is, preferably, a line 13 structured to deliver an alternating current, such as a 110 volt alternating current. The shore power vehicle assembly 14 includes an electrical input 20, e.g. a plug, a control device 22, a DC converter 24, structured to convert an alternating current to a direct current, a DC electrical network 26, an AC electrical network 28, at least one AC socket 30, and a shore power HVAC system 40. The shore power HVAC system 40 operates off electrical energy provided by the AC electrical network 28. The shore power HVAC system 40 includes an electric compressor 42, an electric condenser fan 44, an electric heater 46 and a diverter valve 48.

The DC electrical network 26 is coupled to a vehicular DC system 33, which is powered by a mechanically driven generator 32, so that various electrical devices powered by the vehicular DC system may be used without the generator running or draining the battery. Preferably, the DC electrical network 26 provides between about 12 and 14.5 volts and more preferably about 13 volts. The AC electrical network 28 preferably operates at 110 volts or 220 volts and may be coupled, via electrical input 20, to the base assembly 12. That is, the shore power vehicle assembly 14 may be plugged into any standard outlet. The AC electrical network 28 provides electrical power to the shore power HVAC system 40 as well as the at least one AC socket 30. The at least one AC socket 30 may be used to power any typical electrical device.

The shore power HVAC system 40 includes a first and a second coolant fluid loop 50, 52. The coolant fluid loops 50, 52 are structured to circulate a coolant fluid such as, but not limited to, Freon 435A or Freon or other such coolants. The shore power HVAC system 40 is structured to cooperate with the vehicular HVAC system 60. The vehicular HVAC system 60 includes the following components, an engine compressor 62, a condenser 66, an expansion valve 68, an evaporator 70, and a plurality of conduits 72. Beginning with the engine compressor 62, the first fluid loop 50 includes the following components coupled in series by conduits 72: the engine compressor 62, the diverter valve 48, the condenser 66, the expansion valve 68 and the evaporator 70. In operation, the first fluid loop 50 is substantially similar to the fluid loop of the prior art described above, however, the coolant fluid also passes through the diverter valve 48. Thus, in operation, the coolant fluid is delivered to the engine compressor 62 as a low pressure gas under suction. The engine compressor 62, which is powered mechanically by the engine 3 through mechanical link 80, raises the pressure, and therefore temperature, of the coolant fluid. As the cooling fluid leaves the engine compressor 62, it is a high pressure gas under positive pressure. The high pressure gas coolant fluid is passed to the diverter valve 48 and then to the condenser 66 where it is cooled.

The condenser 66 is a heat exchange device, typically disposed near the front of the vehicle so it may be exposed to an airflow as the vehicle moves. Typically, as shown in FIG. 3, a vehicle includes an engine fan 82 structured to pull air over the condenser 66 as well as the engine radiator 84. The engine fan 82 coupled to the engine 3 by a mechanical fan link 80, such as a shaft. Because the pressure of the coolant fluid remains constant, the coolant fluid is condensed into a liquid as the temperature is lowered in the condenser 66. The high pressure liquid coolant fluid is passed through the expansion valve 68 before entering the evaporator 70. The evaporator 70 and an evaporator fan 71 are disposed in an enclosure in, or adjacent to, the vehicle cabin 2. The evaporator fan 71 is powered by the vehicle DC electrical system 33. Initially, the coolant fluid enters the evaporator 70 as a liquid. As the liquid coolant fluid expands to a gas in the evaporator 70, the evaporator 70 is chilled. The evaporator fan 71 is disposed adjacent to the evaporator 70 draws air over the chilled evaporator 70 and blows the cooled air into the vehicle cabin 2. Often, the chilled air is too cold and a heat exchanger 74 structured to draw heat from the engine 3 raises the temperature of the chilled air. After the evaporator 70, the coolant fluid is again a low pressure gas under suction which is delivered to the engine compressor 12.

The second coolant fluid loop 52 passes through, in series, the electric compressor 42, the diverter valve 48, the condenser 66, the expansion valve 68 and the evaporator 70. The second coolant fluid loop 52 is used when the engine 3 is not in use. The second coolant fluid loop 52 operates as follows. The coolant fluid is delivered to the electrical compressor 64 as a low pressure gas under suction. The electrical compressor 64, which is powered by the AC electrical network 28, raises the pressure, and therefore temperature, of the coolant fluid. As the cooling fluid leaves the electrical compressor 64, it is a high pressure gas under positive pressure. The high pressure gas coolant fluid is passed to the diverter valve 48 and then to the condenser 66 where it is cooled.

Because the vehicle 1 is not in motion when the shore power HVAC system 40 is in use, there is no natural air flow over the condenser 66, nor is the mechanically powered engine fan 82 operating. Accordingly, air flow over the condenser 66 provided by electric condenser fan 44. The electric condenser fan 44 is preferably powered by the AC electrical network 28. The condenser fan may also be powered through the DC electrical network 26. Because the pressure of the coolant fluid remains constant, the coolant fluid is condensed into a liquid as the temperature is lowered in the condenser 66. The high pressure liquid coolant fluid is passed through the expansion valve 68 before entering the evaporator 70. As before, the coolant fluid enters the evaporator 70 as a liquid. As the liquid coolant fluid expands to a gas in the evaporator 70, the evaporator 70 is chilled. The electric evaporator fan 71 disposed adjacent to the evaporator 70 draws air over the chilled evaporator 70 and blows the cooled air into the vehicle cabin 2. The electric evaporator fan 71, preferably, receives electrical power from the vehicular DC electrical system as before. The vehicular DC system however, is provided power through the shore power DC network 26, as discussed above, instead of from the engine powered generator. Alternatively, the evaporator fan 71 may also be coupled to an AC motor (not shown) and be powered by the AC electrical network 28. After the evaporator 70, the coolant fluid is again a low pressure gas under suction which is delivered to the electrical compressor 42. Additionally, in cold weather, the electric heater 46, which is in fluid communication with the cabin 2, is used to provide heat to the shore power HVAC system 40.

Selection of which coolant fluid loop 50, 52 is controlled by the diverter valve 48, which is, in turn, controlled by the shore power system control device 22. That is, the diverter valve 48 has a first coolant fluid inlet 90 and a second coolant fluid inlet 92 and a single coolant fluid outlet 94. The diverter valve 48 includes a valve element (not shown) that is structured to move between two positions; a first position wherein coolant fluid may flow through the first coolant fluid inlet 90 and a second position wherein coolant fluid may flow through the second coolant fluid inlet 92. The first coolant fluid inlet 90 is coupled to the conduit 72 extending between the engine compressor 62 and the diverter valve 48. The second coolant fluid inlet 92 is coupled to the conduit 72 extending between the electrical compressor 42 and the diverter valve 48. Thus, when the diverter valve 48 is in the first position, the first coolant fluid loop 50 is utilized and when the diverter valve 48 is in the second position, the second coolant fluid loop 52 is utilized. When the vehicle 1 is not coupled to the land based AC power line 66, the shore power system control device directs the diverter valve 48 to the first position. Thus, when the vehicle is, for example, traveling, the vehicle uses the first coolant loop 50 which includes the engine compressor 62. Conversely, when the vehicle 1 is coupled to the land based AC power line 13, the shore power system control device directs the diverter valve 48 to the second position. Thus, when the vehicle 1 is, for example, coupled to a shore power base assembly 12 at a truck stop, the vehicle 1 uses the second coolant loop 52 which includes the electric compressor 64.

While specific embodiments of the invention have been described in detail, it will be appreciated by those skilled in the art that various modifications and alternatives to those details could be developed in light of the overall teachings of the disclosure. For example, instead of heating the air in the enclosure 34, the electric heater 46 may be structured to heat the coolant fluid before the fluid enters the evaporator 70, thereby increasing the temperature of the evaporator 70. Accordingly, the particular arrangements disclosed are meant to be illustrative only and not limiting as to the scope of invention which is to be given the full breadth of the claims appended and any and all equivalents thereof.

What is claimed is:

1. A shore power HVAC system for a vehicle, said vehicle having a cabin and a vehicular HVAC system with an engine compressor, a condenser, and an expansion valve and an evaporator coupled to each other in series by a plurality of conduits, said shore power HVAC system comprising:
    an electric compressor structured to compress a coolant fluid;
    a diverter valve structured to allow fluid to pass through a selected fluid path;
    said electric compressor coupled to, and in fluid communication with, said evaporator and said diverter valve;
    said diverter valve further coupled to said engine compressor;
    whereby a first coolant fluid loop and a second coolant fluid loop are created, said first coolant fluid loop passing through, in series, said engine compressor, said diverter valve, said condenser, said expansion valve, and said evaporator, and, said second coolant fluid loop passing through, in series, said electric compressor, said diverter valve, said condenser, said expansion valve and said evaporator; and
    said diverter valve selectively directing which loop the coolant fluid may pass through.

2. The shore power HVAC system for a vehicle of claim 1 further including an electric condenser fan disposed adjacent to said condenser structured to enhance air flow over said condenser.

3. The shore power HVAC system for a vehicle of claim 1 further including an electric heater, said heater in fluid communication with said cabin and structured to heat air within said cabin.

4. The shore power HVAC system for a vehicle of claim 1, wherein said electric compressor is structured to be powered by a 110 volt alternating current.

* * * * *